UNITED STATES PATENT OFFICE.

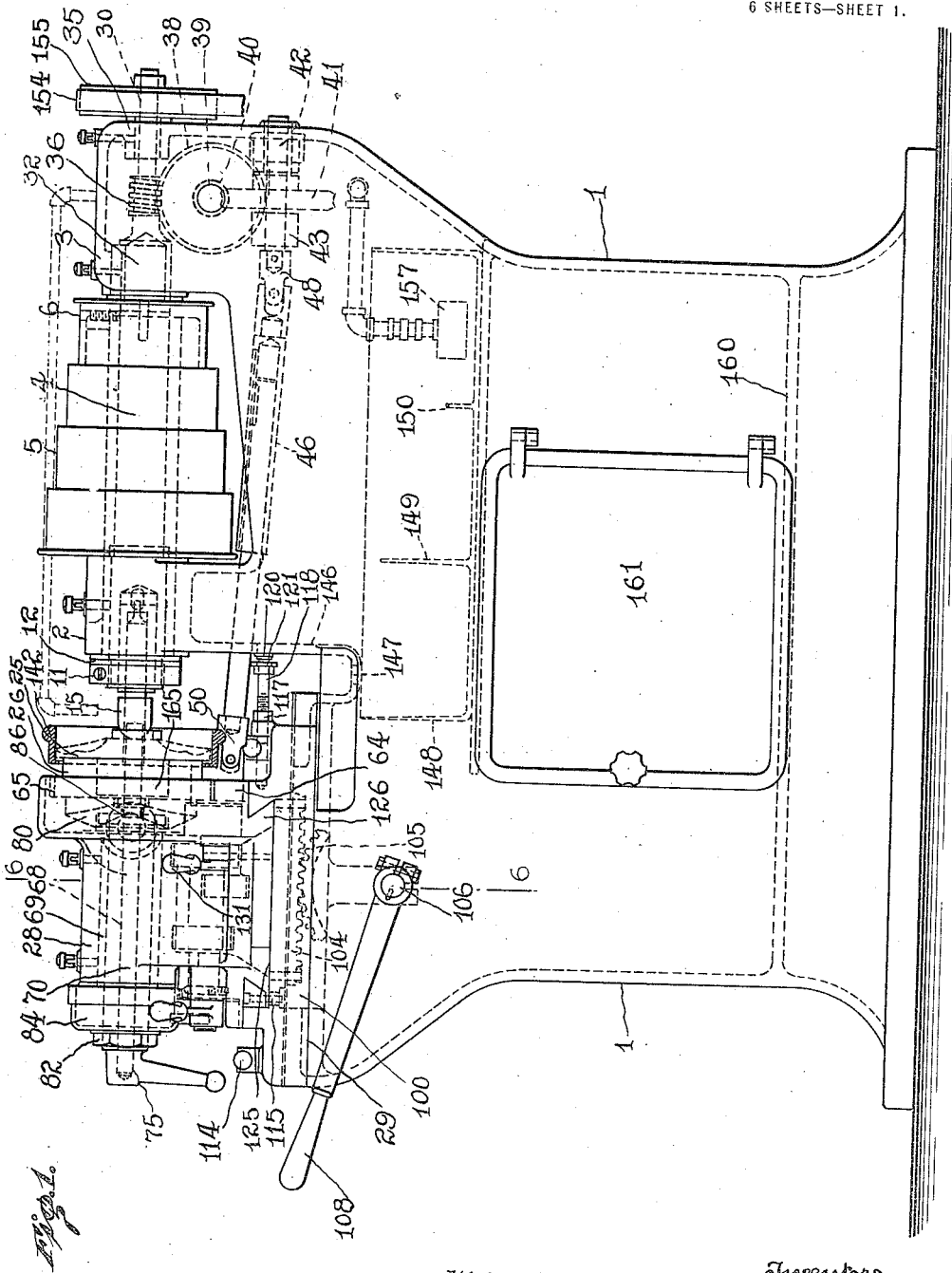

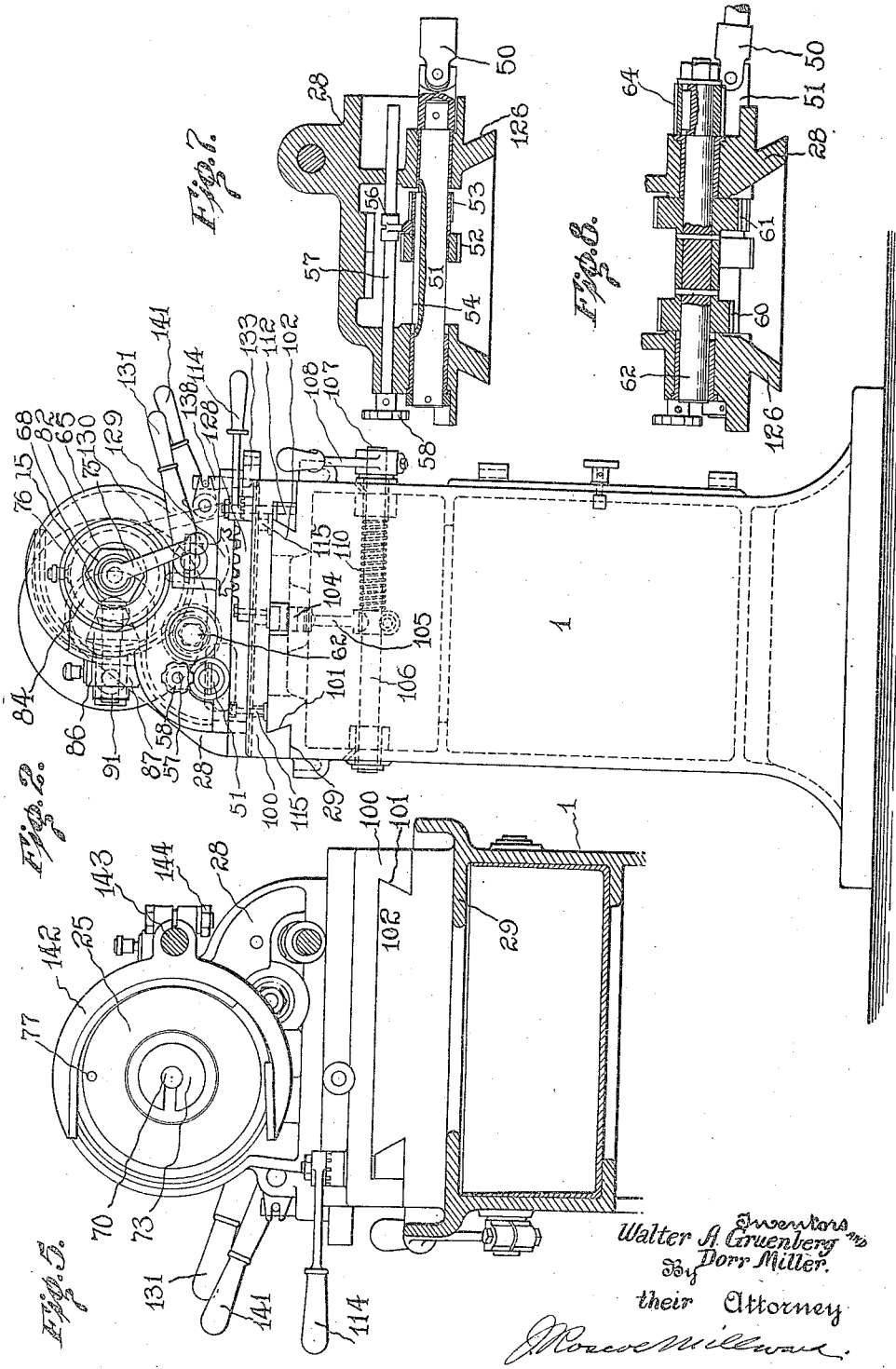

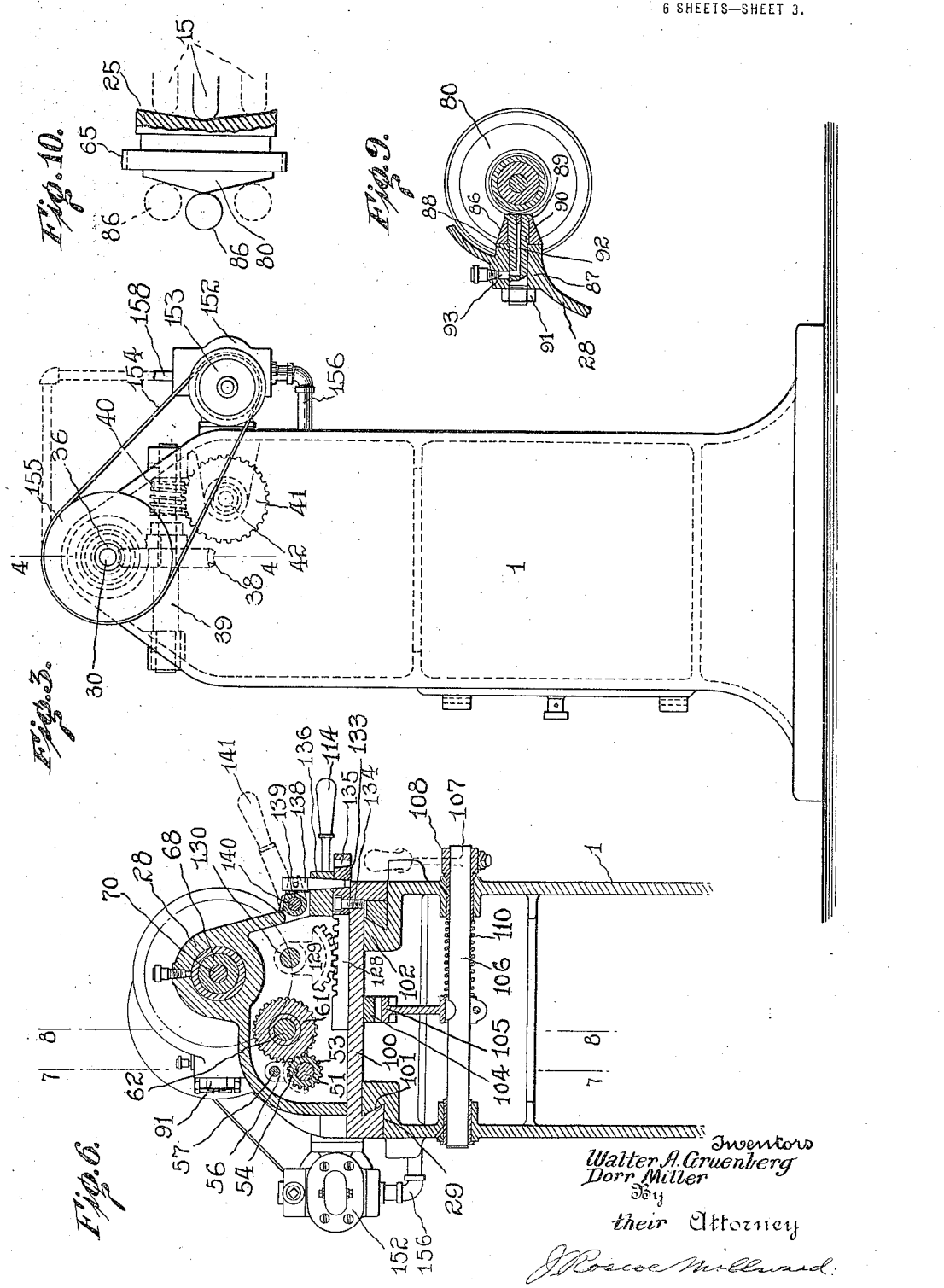

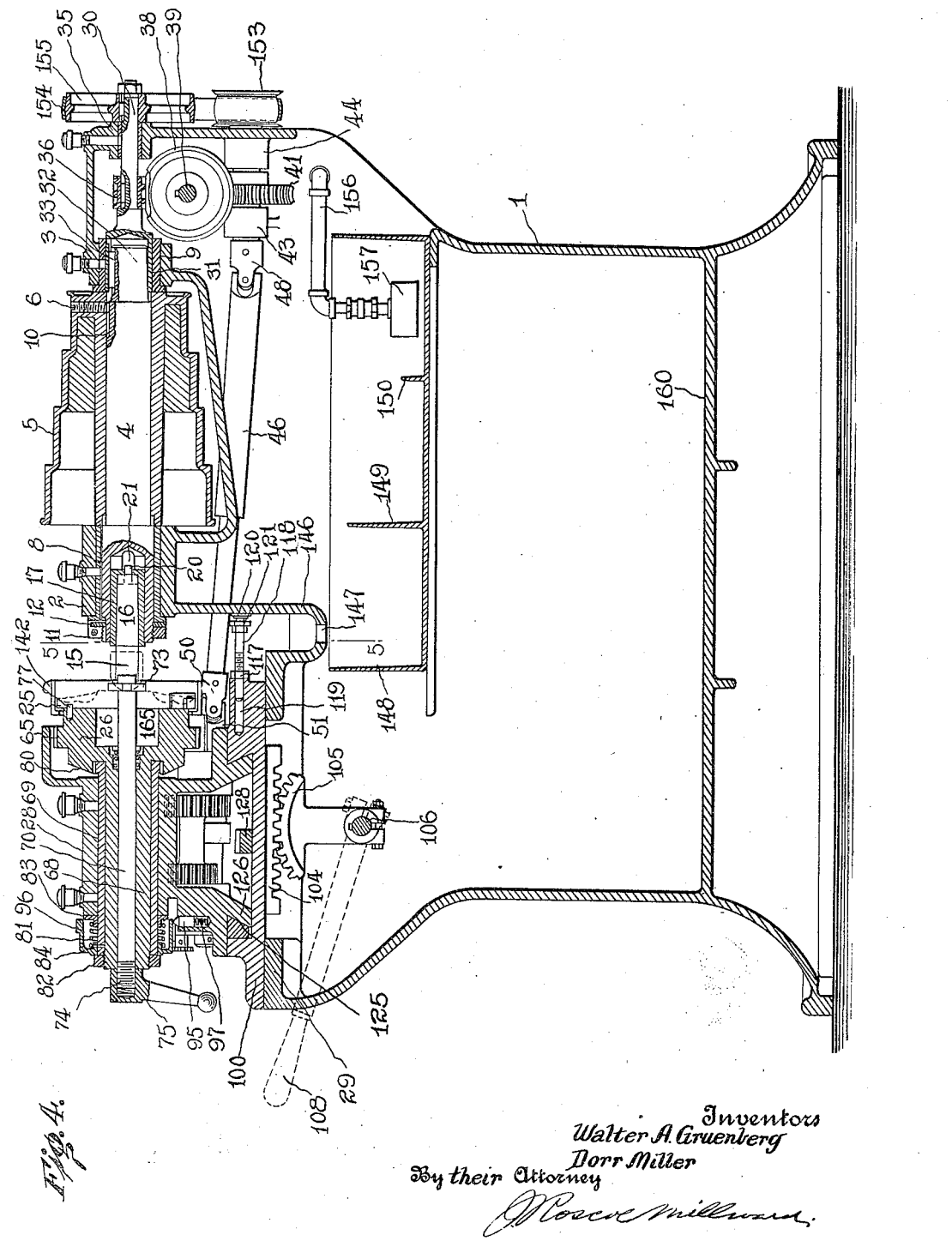

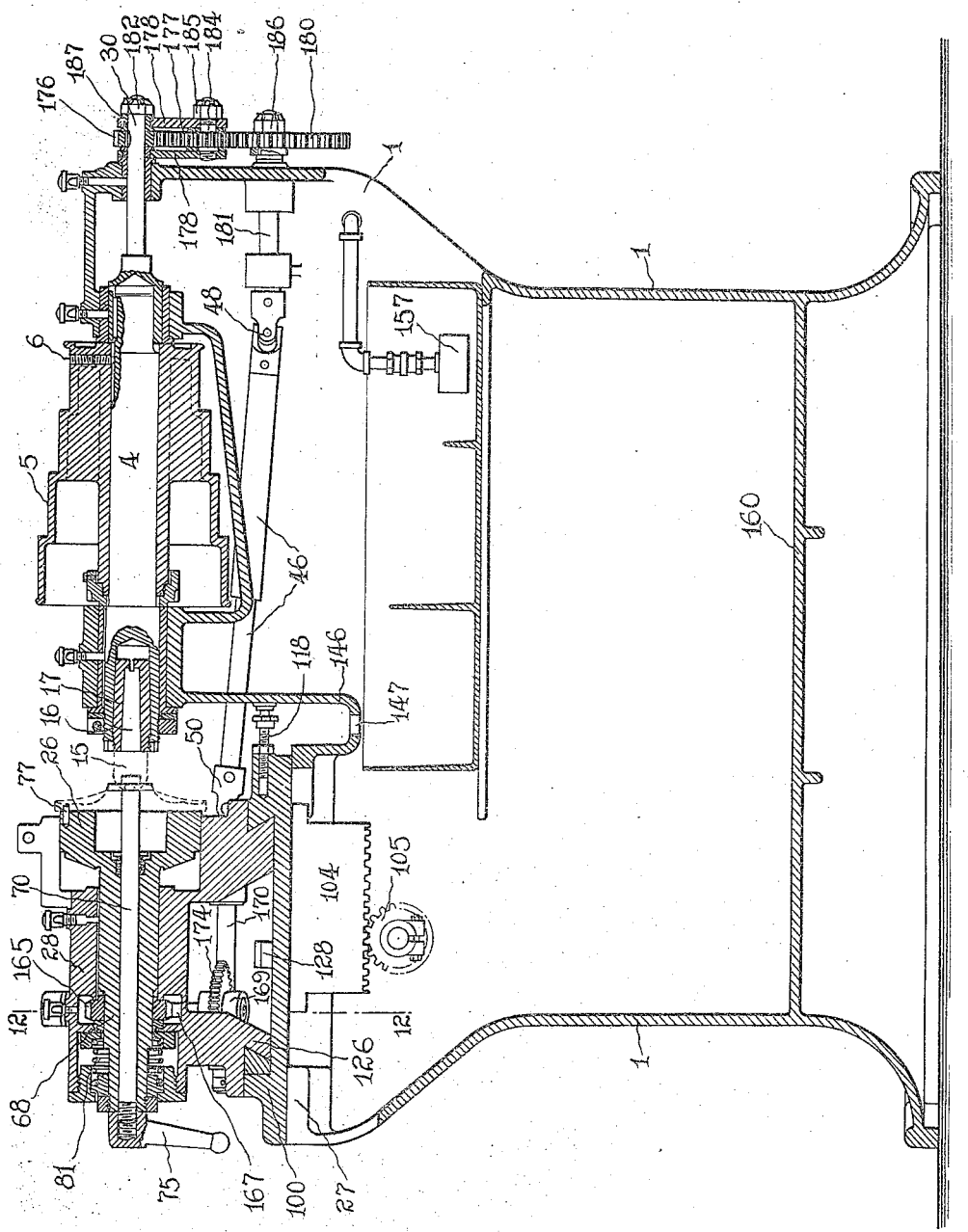

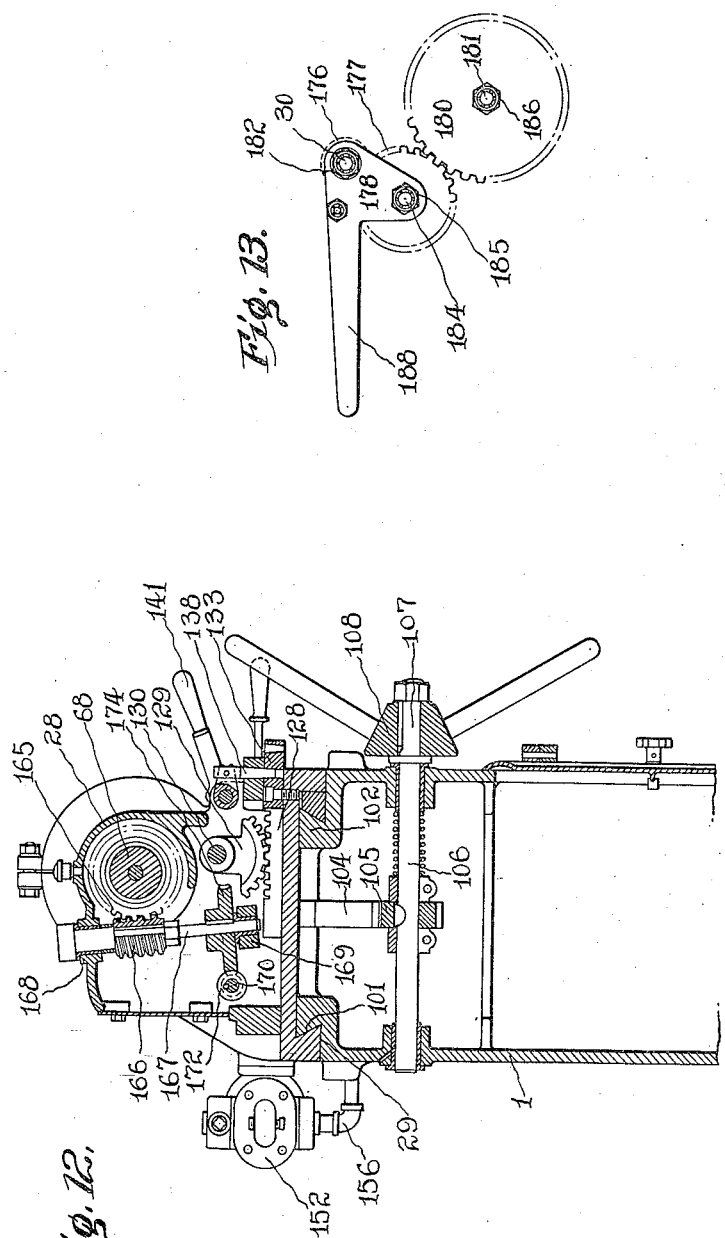

WALTER A. GRUENBERG AND DORR MILLER, OF DETROIT, MICHIGAN, ASSIGNORS TO THE MILLER TRANSMISSION COMPANY, OF NEW YORK, N. Y., A CORPORATION OF MAINE.

MILLING MACHINE.

1,422,850.  Specification of Letters Patent.  Patented July 18, 1922.

Application filed September 22, 1919. Serial No. 325,313.

*To all whom it may concern:*

Be it known that WALTER A. GRUENBERG and DORR MILLER, citizens of the United States, residing at Detroit, in the county of Wayne and State of Michigan, have invented new and useful Improvements in Milling Machines, of which the following is a specification.

This invention relates to improvements in milling machines particularly adapted for the milling out of cam grooves of undulating contour and is designed particularly for the milling out of the undulating cam surfaces of curved sectional contour and in plural arrangement to successfully and accurately produce the cams or cam grooves of the differential gearing device as illustrated in United States Letters Patent No. 1,282,614 to Dorr Miller and issued under date of October 22, 1918.

The device as disclosed in said patent embodies driven or disc members each of which is provided on its face with a plurality of concentrically arranged and undulating cam surfaces or grooves which are complemental in contour and arrangement so as to co-act with spherical clutch members interposed between the co-acting cam surfaces. These cam surfaces or grooves are of relative contour or curvature to maintain coupling contact at all times with the coupling elements or balls but to permit of relative rotation of the respective driven discs in a definite and compensating relation whereby the driven discs are permitted to rotate reversely and in corresponding degree with reference to the coupling members. As described, in the patent aforesaid, the resulting operation is a true differential action wherein the advance rotation of one of the driven members with respect to the driving member or clutches is in definite and direct ratio to the corresponding retarding or reverse rotation of the other of the driven members with reference to the driving member. It is moreover provided that the undulating cams shall be of such contour as to at all times maintain contact with the coupling balls so as to prevent back-lash or lost motion in the device and as by reason of the undulating contour of the co-acting cam surfaces, the axis of contact of the balls with the respective cam grooves is a constantly shifting factor requiring accurate cutting or forming of the cam grooves to compensate therefor.

The machine of our present invention is adapted successfully to mill out the cam grooves of the character described or of other contour and is further designed to permit of conveniently and efficiently milling out the cam grooves in plural arrangement and to be adjustable for the formation of cams of different sizes or pitch diameter and of varying depth as required. Important features of our improved machine consist in an improved arrangement of the operating parts whereby the proper relative speed of the cutting tool is obtained with reference to the progression of the milling operation for the different size cams; means to insure the constant cutting feed of the work with relation to the revolution of the tool and to effect the relative guidance of the work with reference to the tool, the provision of work holders in an approved arrangement whereby the gearing is automatically changed when changing the work holders to determine the proper rotation thereof; an improved means for advancing and retracting the cam with relation to the milling tool, said means being designed to determine the contour or profile of the undulations of the cam; means for conveniently and readily changing the relative position of the operating parts for the cutting of cams of different pitch diameter and of different thickness and further to compensate for wear on the cutting tool; means for conveniently and accurately determining the depth of groove to be cut and the provision of suitable means for locking the parts in their respective adjusted position and an improved arrangement of the parts whereby the work may be readily and conveniently adjusted in position and is correspondingly easily removable.

A further important and valuable feature of our improved machine consists in the employment of a controlling or guiding cam to determine the undulating contour of the groove being cut and the relative arrangement of the co-acting parts whereby in the milling operation there will be no disturbance to the proper relative and progressive action of the parts by reason of back-lash resulting from alternation of the movement in milling of surfaces of opposite inclination, such as would produce deviation from the proper contour of the cam being cut and would further tend to subject the tool to excessive wear or to cause it to draw away from the work with resulting inaccuracy in the cam produced.

The foregoing and other valuable features and advantages of our improved machine will be understood by reference to the accompanying drawings wherein like reference numerals are used to designate the corresponding parts in the several views. In the drawings:—

Fig. 1 is a view in side elevation of a machine constructed in accordance with our invention.

Fig. 2 is a front end elevation thereof.

Fig. 3 is a rear elevation of the foregoing.

Fig. 4 is a central, longitudinal, vertical sectional view on line 4—4 of Fig. 3.

Fig. 5 is a detailed sectional view on line 5—5 of Fig. 4.

Fig. 6 is a vertical cross sectional view on line 6—6 of Fig. 1.

Fig. 7 is a detailed longitudinal vertical section through the work carriage on line 7—7 of Fig. 6.

Fig. 8 is a similar view taken on line 8—8 of Fig. 6.

Fig. 9 is a detailed vertical sectional view taken centrally through the guide roller.

Fig. 10 is a diagrammatic view to illustrate the relation of the controlling cam and associated parts in different positions.

Fig. 11 is a vertical longitudinal section corresponding to Fig. 4 and illustrating a desirable modified construction.

Fig. 12 is a vertical cross-sectional view on line 12—12 of Fig. 11 and

Fig. 13 is a detailed view in rear elevation illustrating the gear shifting parts.

In the embodiment of the features of our invention as herein illustrated 1 indicates a suitable supporting standard or frame upon which the operating parts are supported and suitably journalled. In suitable bearings 2 and 3 there is shown the rotary spindle 4 to carry the milling or cutting tool, this spindle having supported thereon and connected therewith the driving pulley 5. The driving pulley 5 is here shown connected to the spindle by means of a set screw 6. This driving pulley is formed as a step pulley to provide for changing the rotary speed of the milling tool as desired. As best shown in Fig. 4 the bearing sleeves 2 and 3 are desirably fitted with tapered bearing sleeves 8 and 9 and the spindle 4 is journalled therein and capable of longitudinal adjustment provided for by the slotting of the spindle at 10 to receive the set screw 6 and the arrangement of an adjusting nut 11 threaded upon the forward end of the spindle and engaging a washer 12 interposed between the adjusting nut 11 and the forward end of the bearing sleeve 8. As will be readily understood upon loosening of the set screw 6 the adjustment of the nut 11 will effect longitudinal movement of the spindle to determine the position of the cutting or milling tool carried thereby. The tool is here shown as a spherical headed milling tool 15 having a rearwardly extending tapered shank 16 fitted within a holder sleeve 17 positioned within a socket therefor formed in the spindle. The milling tool at its inner extremity is provided with a key extension 20 registering with a co-acting key slot 21 in the spindle whereby the said parts are secured to rotate together. In accordance with the foregoing arrangement it is designed that the milling tool will be rotatable with the spindle and in a stationary position and the work to be operated upon is supported to be movable with relation to the milling tool to mill out cam surfaces of the desired configuration and in so operating it is arranged that the rotary or other motion imparted to the work shall be transmitted thereto from the spindle operating pulley so as to maintain a definite relation in the progression of the milling operation with reference to the revolution of the milling tool.

In accordance with our improved arrangement the work or cam disc 25 to be milled is carried by a rotatable work holder 26 which is suitably journalled to support the work in proper relation to the milling tool and is automatically shiftable with relation to the tool as the milling operation progresses to properly define the contour of the annular cam grooves to be milled. The milling operation may desirably be designed to finish and accurately contour the cam grooves which have been forged in the face of cam discs of the character described. To successfully accomplish the desired milling operation and to permit of adjusting the parts for varying diameters of cam grooves and depths of cams to be cut we have designed the following improved construction and arrangement.

*Feed driving mechanism.*—For the purpose of imparting a rotary and progressive feed motion to the tool holder we have devised suitable means for transmitting the motion thereto from the driving pulley 5 whereby as aforesaid the progressive feed motion of the work will be in definite relation or ratio to the rotation of the milling tool. As indicated the work holder 26 is suitably journalled with its axis in parallel relation to the longitudinal axis of the spindle 4, the work holder as shown being journalled in a supporting carriage 28 supported to be shiftable, as hereinafter described, upon a work table 29 of the supporting frame 1. The operating connections to rotate the work holder from the spindle 4 include an extension shaft 30 having integrally formed on its forward end a sleeve portion 31 within which is received the reduced portion 32 of the spindle 4 and said parts being connected to rotate together by means of a key 33 interengaged with the sleeve 31 and portion 32 of the spindle. The extension shaft 30 is journalled at its rear end in a suitable bearing 35 of the standard and said shaft 30 has keyed thereon a worm 36 in mesh with the teeth of a worm gear 38 affixed to a shaft 39 suitably journalled in the standard 1. As best shown in Fig. 3 the shaft 39 also has keyed thereon a worm 40 engaged to drive a worm gear 41 upon a longitudinally journalled shaft 42 suitably journalled in the respective bearings 43 and 44 of the standard. From the shaft 42 the motion is transmitted through the angularly arranged connection 46 connected by universal joint 48 to the shaft 42 at its rear end and at its forward end similarly connected by universal joint 50 to a sliding gear transmission shaft 51 suitably journalled in the work carriage member 28. The sliding gear shaft 51 is journalled in the work carriage as best shown in Fig. 7 and in horizontal arrangement parallel to the longitudinal axis of the machine and has slidably keyed thereon sliding transmission gears 52 and 53. The gears 52 and 53 as shown are integrally formed and keyed to the shaft 51 by means of elongated key 54 and the gear member is arranged to be shiftable by means of a yoke 56 engaging the gear member intermediate of the gears 52 and 53 and affixed to a shifting rod 57 arranged parallel to the shaft 51 and slidable in suitably bearing apertures in the work carriage member 28. Upon the forward end of the shifting rod 57 there is provided an external hand wheel 58 secured thereto. The gears 52 and 53 are shiftable into position of engagement respectively with co-acting gears 60 and 61 suitably keyed upon a supporting shaft 62 suitably journalled in the work carriage member as best illustrated in Fig. 8 and upon the inner end of the latter shaft there is keyed a work driving pinion 64 positioned to engage with a gear 65 on the work holder 26.

The described feed driving connections are thus operative to impart a rotary feed motion to the work holder 26 by motion transmitted from the driving pulley 5 and accordingly in a predetermined ratio to the rotation of the milling tool 15. By means of the transmission of the drive through the sliding gear transmission afforded by the shiftable gear member 52—53 adapted to establish driving connection between the shafts 51 and 62 either through the engagement of the gears 52 and 60 or 53 and 61 dependent upon the shifting of gear member 52—53 forwardly or rearwardly, it will be seen that the speed ratio is thereby changeable for the milling of the outer cams of larger pitch diameter and the milling of the inner cams of reduced pitch diameter; the gear ratio of the co-acting gears 52 and 60 and gears 53 and 61 being suitably proportioned to effect the speeds desired.

*Work holder and contour means.*—As disclosed the work holder 26 is journalled within the carriage support 28 to rotate about a horizontal axis extending longitudinally of and parallel to the axis of the milling cutter 15. In the construction thereof as disclosed the work holder 26 has integrally formed therewith a forwardly extending bearing sleeve 68 fitted within a bearing collar 69 received within a bearing aperture in the carriage supporting member 28. The extension sleeve 68 is provided with a longitudinal bore to receive a clamping bolt 70 for securing the work in position in the holder to be operated upon. The work as here indicated consists of a cam disc 25 for a differential of the character described and the clamping bolt 70 is passed through a central aperture therein and provided upon its inner end with an open sided holding washer 73 and at its outer or forwardly projecting extremity is threaded at 74 to receive a clamping nut and lever 75 for manually clamping the disc 25 rigidly to the holder 26. The locking pin 77 is fitted to register with apertures in the cam disc 25 and the work holder 26 to secure the disc against rotation with relation to the tool holder and to determine its correct position thereon.

As indicated the work holder is suitably elongated with reference to the bearing therefor in the support 28 to be capable of longitudinal movement therein forwardly and rearwardly during the milling operation for the purpose of defining the contour of the undulating or other cam surface to be milled. The means for controlling this fore and aft movement of the work holder consists in the provision of a master or guiding cam 80 associated with the work holder and adapted to effect the longitudinal shifting of the work holder against the influence of a compression spring 81 (Fig. 4) suitably arranged to exert a forwardly directed pressure upon the work holder and normally to withdraw the work from the milling tool 15. For this purpose, as disclosed, the sleeve 68 of the work holder has a retaining nut 82 threaded upon its marginal forward end portion to retain a spring bearing cup 84 fitted over the collar 69 and providing an outer bearing shoulder for the spring 81. The spring 81 bears thereagainst and also at its inner end bears upon a bearing washer 83 surrounding the collar 69 and abutting the forward surface of the bearing 28 whereby it will be normally operative to move the work holder toward the left as shown in Fig. 4.

The master cam 80 as here illustrated is of annular form and is arranged concentric to the axis of rotation of the tool holder 26 and to co-act therewith, whereby the cam 80 will impart a longitudinal movement to the work holder, the cam being arranged to bear against or contact with a fixed bearing roller 86 suitably journalled in a transversely arranged bearing 87 formed in the work supporting carriage 28. As indicated the cam is desirably formed of beveled contour and the co-acting stationary roller 86 is correspondingly beveled or of conical form whereby the surface speeds throughout the line of contact between the cam and roller is such as to avoid slippage and consequent wear. As best shown in Fig. 9 the roller 86 is journalled upon a removable bearing pin 88 formed with a retaining shoulder 89 at its inner end to retain the roller thereon and having a spacing shoulder 90 engaging with the bearing 87. At its outer end it has a clamping nut 91 threaded thereon. The bearing pin 88 is also provided with a suitable oil duct 92 to lubricate its bearing surface and communicating with an oil passage 93 formed in the bearing portion 87 of the carriage.

In the operation of the machine in so far as described it will be seen that the work holder will be operated with a progressive rotary feed motion to correspondingly advance the work with reference to the milling tool 15 and simultaneously therewith the action of the master cam 80 bearing against the stationery roller 86 will impart a longitudinal movement to the work holder to move the work toward and from the milling tool 15 whereby the cam surfaces being milled will conform to the undulations or configuration of the master cam 80.

In accordance with a further feature of our invention suitable means are provided to enable the operator readily to determine when the milling of the annular cam surfaces has been completed. The means therefor as here shown (Fig. 4) consist of a holding pin 95 arranged to yieldingly engage with a suitable depression in an annular flange 96 of the spring bearing cap 84. The holding pin 95 is fitted within a suitable vertical bore in the work carriage casting 28 and is yieldingly held in engagement with the spring cap 84 by means of a compression spring 97 thereunder. As the spring cap 84 is supported to rotate in unison with the work holder 26 it will thus be seen that the operator is enabled to determine the completion of the milling operation by the registration of the pin 95 with the suitable depression in the cap member 84. Also it will be readily understood that this engagement further operates to lock the cam holder in its initial position while changing the work being operated upon and during the shifting of the gears for milling cams of different diameter. The locking means thus afforded is further yieldable under the driving pressures as will be readily understood.

*Longitudinal adjustment.*—In our improved machine it is provided that the work holder and associated parts shall be adjustable longitudinally of the machine to change the relation of the work toward and from the milling tool. This movement as will be readily understood allows for the adjustment required to accommodate for the milling of cams of different thickness, convenience in positioning the work to be operated upon and to compensate for wear on the milling tool. As herein provided it is arranged that the work carriage 28 and all parts carried thereon shall be capable of longitudinal sliding movement to effect the required adjustment. Accordingly the work carriage 28 is mounted upon a slide-way member or plate 100 formed with a dove tailed slide-way 101 fitted to a complemental guide way or tongue portion 102 extending longitudinally of the table portion 29 of the machine standard. In consequence the slide-way member 100 and parts carried thereon are capable of being moved forwardly and rearwardly in the direction longitudinal of the machine and suitable manually operable means are provided for conveniently effecting this movement. In the embodiment as shown the carrier plate 100 has secured to its under surface a suitable rack 104 positioned to be engaged by a gear segment 105 keyed upon a rock shaft 106 journalled in the frame 1, transversely thereof and provided on its external end portion 107 with a hand lever 108 secured thereon. A coil spring 110 is fitted on to the rock shaft 106 and connected at one end to the segment 105 and at its opposite end to the bearing portion of the standard 1 to exert a pressure on the gear segment 105 in a direction normally to move the work holder toward the milling tool 15. As a result, movement of the lever 108 will be instrumental to transmit longitudinal movement to the carrier plate 100 either forwardly or rearwardly and will correspondingly move the work holder 26, work and associated parts toward and from the milling tool 15. A suitable locking gib 112 having an operation handle 114 is supported upon the carrier 100 as shown for the purpose of locking the carrier in position after adjustment by means of the lever 108. The carrier plate 100 is also desirably provided with tension adjusting screws 115 having enlarged lower bearing surfaces engaging the upper surface of tongue member 102 to provide for tight sliding adjustment of the carrier plate.

For accurately adjusting and determining the depth of the groove to be milled a rotatably adjustable stop is provided comprising a stop nut or shoulder member 117 threaded upon a rotatable adjusting shaft 118 having end bearings in the carrier plate 100 and in a suitabe bore 119 and in the frame member at 120. Adjusting shaft 118 is provided with a suitable hand wheel 121 for manually adjusting the same. As will be readily understood the hand wheel 121 may be suitably graduated to indicate its adjustment.

To accommodate for the longitudinal adjusting movement as described, the angularly disposed connection 46 for the transmission of the feed movement to the work holder is formed as a two part key and telescope connection as shown, whereby said connection will elongate and contract as the circumstances require.

*Transverse adjustment.*—The annular cam surfaces to be milled in the cam discs of the character hereinbefore referred to are of differing pitch diameter for the respective outer and inner cam grooves and also vary in the pitch diameter for the different sizes of cam discs. In our improved machine it is arranged and provision is made for adjusting the relation of the tool holder and the work to the milling tool to properly and accurately co-relate the parts for the milling out of the cams of varying pitch diameter. As best shown in Fig. 2 it will be noted that the longitudinal and parallel axes of the work holder and work concentrically held thereby and of the milling tool are arranged in a horizontal plane and offset therein corresponding to the pitch diameter of the annular cam surface to be milled. According to our invention; throughout the entire range of adjustment for varying sizes of cams, the milling tool and work holder are maintained with their axes in a horizontal plane and provision is made to shift their relation transversely or laterally in said plane corresponding to the pitch diameter of the cams to be milled. The means therefor as here provided consists in the arrangement of a transverse slide-way 125 of dove tailed form provided upon the upper surface of the carrier plate 100 to which the work carriage member or casting 28 is slidably fitted by means of a complemental dove tailed or tongue portion 126 formed upon the bottom thereof as best illustrated in Fig. 1. In consequence the tool holder and driving connections therefor together with all parts carried by the work carriage member 28 are capable of transverse movement in a horizontal plane. For manually effecting this movement the carrier plate 100 is provided with a transverse rack 128 affixed to its upper surface, the teeth of which are engaged by a segmental shifting gear 129 journalled upon a rock shaft 130 arranged longitudinally of and journalled in the carriage member 28. The segmental gear 129 is provided with an outwardly extending operating lever 131 whereby the former is oscillated to shift the carriage member and its associated parts transversely or laterally with relation to the milling tool. The lateral shifting of the work carriage and parts carried thereby thus provided for is permitted without disturbance to the feed drive connections by reason of the universal joints 48 and 50 of the telescopic connection 46.

*Locking means* (Fig. 6).—An additional feature of the arrangement for laterally adjusting the work carriage for different pitch diameter cam grooves consists in providing means for accurately and positively locking the carriage in position for milling cam grooves of predetermined pitch diameter. For this purpose we have devised an effective locking means comprising a gauge plate 133 removably secured to the carrier plate 100 by means of a securing bolt 134. The gauge plate 133 is provided with tapered apertures 135 positioned for registration with an aperture 136 in the work carriage member 28 as best shown in Fig. 6. The apertures are desirably of tapered contour as illustrated and are relatively spaced to determine the pitch diameter of the cams to be milled and the locking of the work carriage plate is effected by a suitable locking pin 138 fitting registering apertures 135 and 136. For conveniently withdrawing the locking pin 138 said pin is pivotally carried upon a lifting arm 139 mounted upon a suitably journalled rock shaft 140 provided with a hand lever 141. As designed the gauge plate 133 is desirably provided with two apertures 135—135 to properly position the parts for milling the inner and outer cam grooves of the cam discs of a given size and may be replaced by interchangeable gauge plates for other sizes of cam discs to be milled.

As best shown in Figs. 4 and 5 a stationary guard and holder member 142 of arcuate form is adjustably supported upon a longitudinally arranged bearing post or rod 143 supported upon the carriage 28 to be shiftable longitudinally thereon. A suitable clamping bolt 144 is provided for securing the guard member 142 in adjusted position. As indicated the guard member 142 is adapted to inclose the cam disc being milled and is positioned to serve as a support for the cam disc when the latter is being positioned in the work holder 26 and further acts as a holder therefor when the cam disc is released thereby to facilitate its removal.

*Water circulation.*—Suitable means are provided for directing a jet of water on to the tool and the surface of the cam disc being milled thereby for the purpose of effecting a cooling action and for carrying off the millings or chips removed. In accordance with my invention the table portion 29 of the supporting frame 1 is formed at its rear end with a suitable collecting pan 146 arranged beneath the operating parts and provided with a discharge passage 147 which may be fitted with a suitable strainer and the drippings therefrom pass into a water supply tank 148 as shown, extending rearwardly therefrom and provided with suitable overflow partitions 149, 150 whereby the chips will be precipitated in the forward portion of the tank. To circulate the water a suitable rotary pump 152 (Fig. 3) is supported upon the standard 1 and provided with a driving pulley 153 driven by a belt 154 carried by a pulley 155 keyed upon the spindle extension shaft 30 whereby the pump is driven from the latter. As indicated the pump is connected by an intake pipe 156 to receive its supply from the rear compartment of the water tank 148 through a suitable strainer 157 positioned therein. From the discharge end of the pump the water is delivered through a suitable jointed conduit or tube 158 having its discharge end directed upon the milling tool and surface being acted upon.

Beneath the water tank the supporting standard 1 is desirably provided as shown with a shelf 160 forming the bottom of a compartment enclosed by the sides of the frame 1 and provided with a hinged door 161 giving access thereto. The compartment thus formed provides a convenient place for the storage of different sizes of work holders, clamping bolts, gears, etc. when not in use.

*Operation.*—As will be readily understood from the foregoing description, in the operation of the machine the rotation of the milling tool 15 and the rotary feed of the work holder 26 is transmitted from the driving pulley 5 in proper predetermined ratio to successfully perform the milling operation. As described the sliding gear transmission afforded by the shiftable gearing member 52—53 with the co-acting gears is designed to properly proportion the speed ratios for milling the respective outer and inner cam grooves and permits of readily and instantly changing the gear ratio as desired. It therefore follows that having properly adjusted the parts for the milling of either the inner or outer cam groove the machine may be started and will operate automatically to mill out the groove as determined by the undulations of the master cam 80. By the starting of the operation from the initial position, as determined by the registration of the yieldable indicator pin 95 with its co-acting depression in the cap member 84, the operator is enabled to determine the completion of the first milling operation. With the indicator pin 95 again in registration the machine is stopped. The relation of the work carriage 28 with reference to the milling tool 15 is then changed by withdrawing of the gauge locking pin by means of the lifting arm 139. The carriage is then shifted transversely by means of the hand lever 131 to position the work with reference to the milling tool for the milling out of the other of the cam grooves as indicated by the registration of the locking pin 138 with the second co-acting aperture 135 of the gauge plate 133. By also changing the gearing ratio upon shifting of the sliding gear transmission by means of the shifting rod 57, the operation may be resumed and the milling of the second cam will be automatically and progressively effected and its completion will be indicated upon the subsequent registration of the indicator pin as described. The machine then being stopped the finished cam disc is removed and replaced by a new cam disc and if the same size cam discs are being operated upon in succession the operation may be resumed without resetting by initially milling of the cam groove of the latter disc corresponding to the groove of the preceding which was last milled.

As will be readily understood, when cam discs of different size are to be milled the work holder 26 is removed and replaced with one of a size proportioned to the cam disc to be milled. In so doing, for the purpose of at the same time changing the gearing ratio, advantage is taken of the fact that as the cams increase in size the revolutions per minute decrease to obtain a uniform surface speed of milling action. To this end each holder has desirably integrally formed therewith a gear 65 and correspondingly the driving pinion 64 is removably supported to be interchangeable with one of proper size to coact with the respective work holders. As shown the cam disc 25 is provided with an annular hub portion 165 provided with an axial bore therethrough. The work holder 26 is formed with a suitable socket to receive the hub portion 165 of the cam disc and may desirably be of close fit therewith to center the cam disc therein. In changing the work holders 26 it will be understood that the clamping bolt 70 associated therewith is also replaced by others of suitable dimensions proportioned to the different sizes of cams. In effecting such change the gauge plate 133 is changed for one having its apertures 135 spaced with relation to the diameters of the annular cams of the disc and the longitudinal adjustment of the carriage member 28 and parts carried thereby, as required by the depth of the cam disc to be milled, is effected as hereinbefore described by means of the hand lever 108 upon releasing of the locking gib 112. Movement of the hand lever 108 will impart a longitudinal movement to the carrier or slide plate 100 and to the work carriage 28 and associated parts and the adjustment thereof may be determined by the adjustable stop 117.

An important and valuable feature of our improved machine as described consists in the relative arrangement of the co-acting parts related to the milling operation whereby there will be no disturbance to the proper relative and progressive action of the parts by reason of the back-lash or lost motion resulting from the alternation of movement in the milling of the surfaces of undulating contour and of opposite inclination. As will be readily appreciated in the cutting of cam surfaces of this character there is normally in response to the reaction of the cam surfaces of reversed inclination a tendency to cause the tool to draw away from the work in response to the reactive pressures which is accompanied by a resulting inaccuracy in the milling operation: In our improved arrangement as herein disclosed this tendency is overcome or compensated for by the relative arrangement of the inclines of the master cam with relation to the inclines of the cams being milled whereby the angles of pressure by the former upon its co-acting roller and by the latter upon the milling tool will be in opposed and compensating relation. This will be best understood with reference to diagrammatic illustration thereof in Fig. 10 wherein three progressive relative positions of the respective parts are indicated and from which it will be noted that when the angle of pressure upon the roller and master cam side favors revolving of the cam holder in one direction the engagement of the cam groove with the milling tool at the opposite side will be such as to favor revolving of the cam holder in the opposite direction so as to compensate therefor and produce a balanced effect. Upon the progression of the work the angles of pressure are similarly balanced and reversed with cutting of the surfaces of opposite inclination so that throughout the entire range of operation uniform progressive feeding action is insured. As will be readily appreciated the resulting improved operation will contribute greatly to the accuracy of the milling operation in properly defining the profile of the cams.

While as here described it is desirable to provide for changing the gear ratio for the milling of the outer and inner cams it will however be understood that such change is not essential. Also while as here shown the cam is shown of a form to conform approximately in its action to an eccentric operating or alternating in its movement twice to each rotation of the work holder, it will be understood that the cam may be suitably modified for any desired profile of cam groove to be milled or cut. As here illustrated the spherical ended milling tool conforms in size to the coupling balls to be employed in the differential device and the guiding roller co-acting with the master cam is of a mean diameter corresponding to the diameter of the milling tool.

*Figs. 11 to 13.*—While we have described a desirable and approved embodiment of the features of our improved machine it will be understood that various modifications may be made without departing from the scope thereof. For instance, in Figs. 11 to 13 I have illustrated a desirable modification which embodies further improvements in the transmission of the feed motion to the work holder. The latter feature is designed to further contribute to the accuracy of the milling operation in that it fully eliminates all danger of back lash and lost motion in the feed transmission.

In the modified construction as disclosed the work holder 26 is suitably journalled in the work carriage 28, generally similar to the arrangement of the embodiment first described. In the present construction it is arranged that the feed movement to be imparted to the work holder shall be transmitted thereto through suitable worm gear connections in the manner as hereinafter described so as to avoid back lash resulting from reactive pressures through the gearing connections. As shown, upon the longitudinally extending bearing sleeve 68 of the work holder there is affixed a worm gear 165' engaged by a driving worm 166 suitably mounted upon a shaft 167 journalled in bearings 168—169 in the work carriage 28. A counter shaft 170 is suitably journalled in the work carriage as shown and has mounted thereon a worm 172 in mesh with a worm gear 174 keyed on the shaft 167. In the arrangement as disclosed the work carriage is suitably supported upon the work table 29 to be capable of both longitudinal and lateral movement as heretofore described.

The rotation of the counter shaft 170 is desirably effected by suitable connections from the spindle 4 and the connections embody a two part connecting rod or shaft 46 suitably connected by a universal joint 50 with the shaft 170 so as to permit of the longitudinal and lateral adjustment of the work carriage as hereinbefore described. The connections from the spindle 4 for transmitting the motion through said flexible shaft 46 as shown comprise a train of spur gearing consisting of a gear 176 mounted upon the spindle extension shaft 30 and meshing with an intermediate gear 177 suitably journalled in an adjustable bracket 178 and engaging a gear 180 journalled upon the external end of a shaft 181 suitably journalled in the standard 1. The latter shaft at its forward end is rotatably connected to the flexible shaft 46 by means of universal joint 48. It will thus be seen that rotation of the spindle 4 by means of the driving pulley 5 through the described connections will impart a rotary feed movement to the work holder 26 and that this feed motion is transmitted thereto through worm gearing which, as is understood, is of a character which eliminates back lash or reverse movement throughout the connections under reacting pressures. The described connections for transmitting the feed movement to the work holder will therefore correspondingly contribute to the accuracy of the milling operation.

As a further feature of the described connections for transmitting the feed motion, provision is made to permit of changing the gear ratio as may be desired so as to determine the speed of rotation with relation to the size of cam groove being milled. For this purpose it is arranged that the spur gears 176, 177 and 180 are readily removable to permit of the substitution of gears of different ratio. In accordance with the construction here shown the gears 176 and 180 are slidably keyed to their shafts and the bracket 178 is removably fitted to the external portion of the shaft 30 and held thereon by a removable nut 182. The gear 177 is journalled upon a bearing stud 184 removably secured to the bracket 178, as shown, by a securing nut 185. Accordingly, upon removal of the securing nuts 182—185 and also a securing nut 186 threaded to the end of shaft 181, the respective spur gears are readily removable and other gears of suitable ratio may be substituted therefor. To permit of so changing the gears the bracket 178 is pivotally supported upon a bearing sleeve 187 fitted to the spindle extension shaft 30 whereby the bracket is shiftable to properly position the bearing stud 184 to effect the proper engagement of the gear teeth of the respective gears 177 and 180. As indicated a lever extension 188 may be provided upon the bracket to facilitate the positioning thereof. As will be understood the other features of the modified machine as disclosed in Figs. 11 to 13 are generally similar to the first described construction.

While we have described desirable embodiments of the many features of our improved machine it will be understood that other and various modifications thereof may be made without departing from the scope of the invention. It is therefore intended that all matter herein shall be interpreted as illustrative and not in a limiting sense.

Having described our invention we claim:

1. In a machine of the character described, the combination of a supporting frame, a rotary cutting tool, driving means therefor, a work supporting table on the frame, a carrier plate fitted thereon and adjustable longitudinally with reference to the tool, said carrier plate being formed with a transverse guide-way, a work carriage fitted to said guide-way and capable of transverse adjustment therein, a gauge plate and coacting locking means associated with the carrier plate and carriage to determine the carriage adjustment therein, a work holder journalled in the carriage and slidable therein toward and from the tool, cam means associated with the work holder to effect the movement thereof toward and from the tool during the milling operation to define the contour of the finished surface and operating connections for the work holder connected to the driving means whereby the feed movement of the work holder is transmitted from the latter in definite ratio, said operating connections comprising a flexible shaft to accommodate for the adjustment of the work holder, substantially as described.

2. In a machine for the milling of undulating cam surfaces the combination of a supporting frame, a rotary cutting tool, driving means therefor, a work holder suitably journalled and adapted for longitudinal movement toward and from the tool, a master cam associated with the work holder, a bearing roller engaged by said cam, said cam being formed with a single undulating guiding or contour surface to control the longitudinal movement of the tool holder to define the contour of the cam surface being finished by the tool and said cam surface being reversely directed to that of the cam being cut whereby the reactive pressures from the engagement of the master cam with its bearing roller will be opposed in direction to the reactive pressures from the engagement of the tool with the surface being milled, substantially as described.

3. In a machine for the milling of undulating cam surfaces, the combination of a rotary tool element suitably journalled, and a work holder element suitably journalled with relation thereto, means for shifting the relation of said elements toward and from each other during the milling operation comprising master cam means associated with one of the said elements, a bearing roller engaged by said master cam whereby the latter will determine the contour of the cam surface being milled, said cam having a single guiding or contour surface and its cam surface reversed with relation to the cam surface being acted upon by the milling tool whereby the angles of the reactive pressures between the master cam and the bearing roller will be opposed in direction to the angles of the reactive pressures between the milling tool and the surface being milled thereby to eliminate backlash, substantially as described.

4. In a machine adapted for the milling of cam surfaces of reversed inclination, the combination of a supporting frame, a rotatable milling tool suitably journalled, a work holder suitably journalled with relation to the tool and supported to be slidable toward and from said tool, a master cam supported to be slidable toward and from said tool, a master cam supported upon the work holder, a bearing roller rigidly supported to be engaged by said cam, resilient means operative to hold the master cam in engagement with the roller, driving means for the milling tool and connections therefrom operative to rotate the work holder and cam, substantially as described.

5. In a machine of the character described, the combination of a supporting frame, a rotatable tool suitably journalled, driving means therefor, a work holder suitably journalled and supported to be adjustable toward and from and transversely with relation to the tool, means for securing the work holder in adjusted position and operating connections for transmitting rotary movement to the work holder from the driving means, said connections embodying a telescopic and flexibly connected shaft adapted to accommodate for the adjustment of the work holder, substantially as described.

6. In a machine of the character described, the combination of a supporting frame, a rotary tool suitably journalled, driving means therefor, a work supporting table on the frame, a carrier slide plate supported thereon and slidable toward and from the tool, a transverse slide-way on the carrier plate, a work carriage fitted to said slide-way and movable transversely therein, a work holder journalled in the carriage and capable of longitudinal movement therein, cam means associated with the work holder to effect the movement of the latter toward and from the tool to define the contour of the cam being milled, operating connections to impart a rotary feed movement to the work holder, said connections comprising shiftable gearing journalled in the work carriage and adapted to change the gear ratio and connections therefrom to the driving means whereby the work holder will be rotated therefrom and said connections being adapted to accommodate for the adjusting movement of the work carriage, substantially as described.

7. In a machine of the character described, the combination of a supporting frame, a rotary tool suitably journalled, driving means therefor, a rotatable work holder suitably journalled with reference to the tool and capable of longitudinal movement toward and from the tool, cam means associated with the work holder and adapted to define the contour of the surface being milled, operating connection for the work holder operative progressively to rotate said holder and arranged to be driven by the driving means and yieldable engaging means associated with the work holder and adapted to act as an indicating and retaining means therefor to determine the initial position of the work holder, substantially as described.

8. In a machine of the character described the combination of a supporting standard, a rotatable milling tool suitably journalled, a work carriage member adjustably supported upon the standard, a work holder suitably journalled in the carriage to be capable of sliding movement toward and from the tool, a master cam supported upon the work holder, a bearing roller rigidly supported to be engaged by said cam, resilient means operative normally to hold the master cam into engagement with its bearing roller, yieldable engaging means associated with the work holder yieldingly to retain the latter in its initial position, driving means for the driving tool and connections therefrom operative to rotate the work holder and cam, substantially as described.

9. In a machine of the character described, the combination of a suitable standard, rotatable tool suitably journalled, driving means therefor, a work supporting member suitably arranged with reference to the tool, a work holder journalled therein, means to rotate the work holder with a progressive feed movement, and a yieldable indicator and retaining means associated with the work holder and comprising a pin fitted within a socket in the supporting member, a compression spring fitted to said socket and a co-acting member rotatably secured to the work holder and provided with a suitable depression positioned to register with the said pin and said spring being operative yieldingly to force said pin into registration with said depression, substantially as described.

10. In a machine of the character described, the combination of a supporting frame, a rotary cutting tool, driving means therefor, a work supporting table on the frame, a work supporting member supported upon the table to be adjustable thereon transversely with relation to the tool, a work holder journalled in the supporting member, driving gearing for the work holder suitably journalled in the supporting member to be shiftable therewith, a gauge plate removably supported adjacent to the work supporting member and provided with securing apertures therein, said supporting member being provided with an aperture positioned to register with the gauge plate apertures and a locking pin fitted to the registering apertures to secure the work supporting member in its respective adjusted positions, substantially as described.

11. In a machine of the character described, the combination of a supporting frame, a rotary cutting tool suitably journalled, driving means therefor, a work supporting table on the frame, a work supporting member carried by the table and arranged to be adjustable thereon laterally with relation to the cutting tool, a work holder suitably journalled in the work supporting member with its axis of rotation parallel to the axis of rotation of the cutting tool and positioned in the same horizontal plane therewith, a gauge plate removably supported adjacent to the work supporting member and provided with a plurality of gauge apertures therein, said work supporting member being provided with a co-related aperture adapted to assume positions of registration with the gauge apertures, a lifting lever pivotally supported upon the work supporting member, a locking pin carried thereby and adapted for coupling engagement with the apertures when in registration to secure the work supporting member in adjusted positions, driving means for the cutting tool and driving connections to the work holder for rotating the latter, substantially as described.

12. In a machine of the character described, the combination of supporting frame, a rotary milling tool suitably journalled, driving means therefor, a work holder suitably journalled with its axis of rotation parallel to and in the same horizontal plane with the said tool, said work holder being supported to be capable of movement longitudinal of its axis of rotation and adjustable transversely thereof, an adjustable gauge associated with the work holder and retaining means coacting therewith for retaining the work holder in plural positions of adjustment laterally with reference to the tool, operating connections for the work holder from the driving means, said connections including shiftable gearing for changing of the gear ratio therebetween and a flexible connection adapted to accommodate for the lateral adjustment of the work holder, substantially as described.

13. In a machine of the character described, the combination of a supporting frame, a rotary cutting tool suitably journalled, driving means therefor, a work supporting member suitably journalled with its axis of rotation parallel to and in the same horizontal plane with the tool and supported to be capable of movement longitudinal of its axis of rotation and adjustable transversely with relation thereto in said horizontal plane, gauge locking means associated with the work holder and adapted to determine and secure the work holder in position for the milling of different sizes of cams, connections from the driving means to the work holder for rotating the latter, said connections comprising shiftable gearing for transmitting the motion in different gearing ratio, means for indicating the initial position of the work holder and cam means associated with the work holder to effect the movement thereof toward and from the tool to determine the profile of the surface being acted upon, substantially as described.

14. In a machine of the character described, the combination of a supporting frame, a rotary cutting tool, driving means therefor, a work supporting table on the frame, a carrier plate fitted thereon and adjustable longitudinally with reference to the tool, said carrier plate being formed with a transverse guide-way, a work carriage fitted to said guide way and capable of transverse adjustment therein, a gauge plate and coacting locking means associated with the carrier plate and carriage to determine the carriage adjustment therein, a work holder journalled in the carriage and slidable therein toward and from the tool, cam means associated with the work holder to effect the movement thereof toward and from the tool and during the milling operation to define the contour of the finished surface and operating means to impart a rotary feed movement to the work holder during the milling operation and an arcuate guard member adjustably supported upon the work carriage to inclose the work being acted on, substantially as described.

15. In a machine adapted for the milling of cam surfaces of reversed inclination, the combination of a supporting frame, a rotatable milling tool suitably journalled, a work holder suitably journalled with relation to the tool and supported to be slidable toward and from said tool, a master cam supported upon the work holder, a bearing roller rigidly supported to be engaged by said cam, resilient means operative normally to hold the master cam in engagement with the roller, driving means for the milling tool and connections therefrom operative to rotate the work holder and cam, and said master cam and bearing roller being formed with beveled or inclined engaging surfaces designed to have corresponding surface speeds throughout their line of contact, substantially as described.

16. In a machine of the character described, the combination of a supporting frame, a rotary cutting tool suitably journalled, driving means therefor, a work supporting member suitably journalled with its axis of rotation parallel to and in the same horizontal plane with the tool and supported to be capable of movement longitudinal of its axis of rotation and adjustable transversely with relation thereto in said horizontal plane, gauge locking means associated with the work holder and adapted to determine and secure the work holder in position for the milling of different sizes of cams, connections from the driving means to the work holder for rotating the latter, said connections comprising shiftable gearing for transmitting the motion in different gearing ratio, means for indicating the initial position of the work holder and cam means associated with the work holder to effect the movement thereof toward and from the tool to determine the profile of the surface being acted upon, a drip pan provided on the frame substantially beneath the milling tool, a water supply tank positioned thereunder, a rotary pump suitably journalled upon the frame, connections from the driving pulley to said pump for operating the latter, a supply connection from the tank to the pump and an adjustable conduit from the pump to direct a jet of water upon the tool, substantially as described.

17. In a machine for milling undulating cam surfaces having a rotary tool element suitably journalled and a work holder element suitably journalled with relation thereto in combination with means for shifting the relation of said elements toward and from each other during the milling operation to define the contour of the cam being milled comprising a master cam having a single guiding or contour surface and means for engaging said cam to determine the contour of the cam surface to be cut, said master cam having its cam surface reversely directed with relation to the cam surface being acted upon by the milling tool whereby the angles of the reactive pressures between the master cam and the means engaging the same will be opposed in direction to the angles of the reactive pressures between the milling tool and the surface being milled so as to eliminate back lash, substantially as set forth.

In testimony whereof they have signed their names to this specification.

WALTER A. GRUENBERG.
DORR MILLER.